United States Patent
Huang (10) Patent No.: US 8,667,264 B2
(45) Date of Patent: Mar. 4, 2014

(54) EXPEDITED COMPUTER BOOT SYSTEM AND METHOD

(75) Inventor: Chung Yuan Huang, Taipei (TW)

(73) Assignee: Shuttle Inc., Taipei (TW)

( * ) Notice: Subject to any disclaimer, the term of this patent is extended or adjusted under 35 U.S.C. 154(b) by 218 days.

(21) Appl. No.: 13/092,286

(22) Filed: Apr. 22, 2011

(65) Prior Publication Data

US 2012/0239918 A1    Sep. 20, 2012

(30) Foreign Application Priority Data

Mar. 14, 2011 (TW) ............................. 100108608 A (51) Int. Cl.
*G06F 9/00* (2006.01)
(52) U.S. Cl.
USPC .......................................................... 713/2
(58) Field of Classification Search
USPC ....................................................... 713/1–2
See application file for complete search history.

(56) References Cited

U.S. PATENT DOCUMENTS

| | | | |
|---|---|---|---|
| 6,718,461 B1 * | 4/2004 | Ewertz | 713/1 |
| RE40,092 E * | 2/2008 | Kang | 713/2 |
| RE42,727 E * | 9/2011 | Kang | 713/2 |
| 2001/0039612 A1 * | 11/2001 | Lee | 713/2 |
| 2002/0108033 A1 * | 8/2002 | Kroening | 713/1 |
| 2002/0133695 A1 * | 9/2002 | Khatri et al. | 713/1 |
| 2005/0005197 A1 * | 1/2005 | Chong et al. | 714/36 |
| 2006/0140577 A1 * | 6/2006 | Ninomiya et al. | 386/46 |
| 2007/0260867 A1 * | 11/2007 | Ethier et al. | 713/2 |
| 2012/0117364 A1 * | 5/2012 | Rosenquist et al. | 713/2 |

\* cited by examiner

*Primary Examiner* — Kim Huynh
*Assistant Examiner* — Alyaa T Mazyad
(74) *Attorney, Agent, or Firm* — Chun-Ming Shih; HDLS IPR Services (57) ABSTRACT

The present invention discloses an expedited computer boot system and method. The expedited computer boot system includes: ROM, RAM, and a module for selecting a boot mode. The module for selecting a boot mode at least includes: a detecting unit and a fast boot unit. The fast boot unit reads configuration settings stored in the RAM and loads into operating system based on the configuration settings if the detecting unit detects no device changed. Otherwise, the fast boot unit reads ROM and Power-On Self Test (POST) is executed if any device is changed. Therefore, the computer system can quickly boot and the time for booting computer is shortened.

6 Claims, 7 Drawing Sheets

EXPEDITED COMPUTER BOOT SYSTEM AND METHOD

FIELD OF THE INVENTION

The present invention relates to expedited computer boot systems and methods, and more particularly, to an expedited computer boot system and method for providing a fast boot mode in which a computer system can load an operating system quickly.

BACKGROUND OF THE INVENTION

A basic input/output system (BIOS) is the most fundamental software program which is loaded on a computer hardware system. Once the power of a computer system is turned on, execution of the BIOS will be performed by a flash memory on the motherboard, followed by the initialization of a subsystem, such as a chipset and a memory. The most fundamental function of the BIOS is to store the basic settings of a computer system and allow a user to set the state of the computer system and related parameters of hardware by means of the BIOS.

Figure 1:
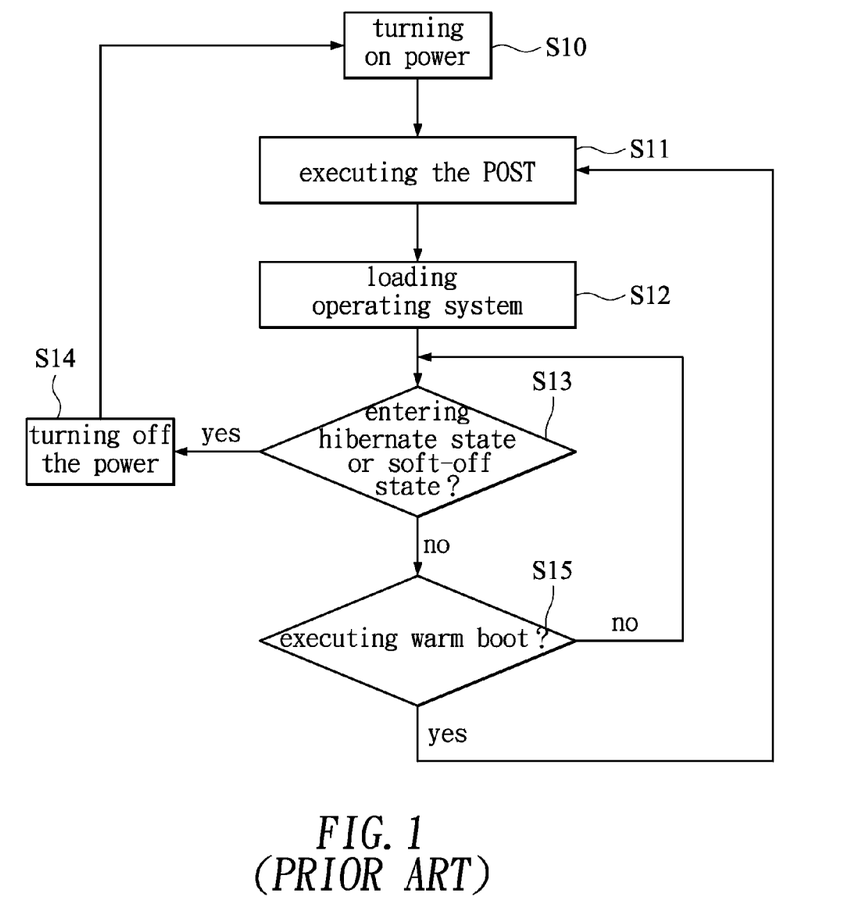
FIG. 1 is a schematic view of a conventional process flow of booting a computer system.

FIG. 1 is a schematic view of a conventional process flow of booting a computer system. As shown in FIG. 1, booting a computer system (step S10) requires execution of a power-on self test (POST) by a BIOS (step S11) to determine a basic configuration and functional state of system devices; meanwhile, the user may press a corresponding hotkey to enter a default main screen of the BIOS so as to adjust related settings. These basic programs are loaded to a memory of the computer system to enable the processor to execute boot-related initialization procedures, whenever the computer system is booted. Upon completion of the execution of the procedures, an operating system is reloaded (step S12), such that the operating system takes control of the system.

In general, a computer system has to comply with ACPI (Advanced Configuration and Power Interface) specification. Hence, once the computer system needs to enter S3 (suspend to RAM, STR) mode, S4 (suspend to disk, STD) mode, or S5 (soft-off) mode, the BIOS will let the operating system know which corresponding value is to be written to a sleep type register in a chipset, so as to be ready for the ensuing state. The aforesaid S3 mode is also known as a sleeping state which involves writing data to a random access memory (RAM), supplying power to the RAM only, and suspending the power supply to other devices. The aforesaid S4 mode is also known as a hibernate state which involves writing to a hard disk the data stored in the RAM and suspending the operation of devices, which means that the power supply to the devices is not suspended until after the data have been written to the hard disk. The aforesaid S5 mode is also known as a soft-off state which involves suspending the power supply to the computer system. The sleeping state, the hibernate state, and the soft-off state are major states of a typical computer system.

If the user selects the hibernate state or the soft-off state (step S13), a corresponding value will be written to the sleep type register in the chipset, such that the power supply to the computer system will be suspended according to the selected state (step S14). Rebooting the computer system again (step S10) entails re-executing the POST by the BIOS (step S11). Upon completion of the execution of the procedures, the operating system is reloaded (step S12). However, in doing so, the user is kept waiting a long time.

Furthermore, even if the user does not select the hibernate state or the soft-off state but selects a warm boot (step S15) for rebooting the computer system, the BIOS will re-execute the POST (step S11) and then load the operating system (step S12). However, in practice, it is not necessary to re-execute the POST, not only because the hardware of the computer system remains unchanged, but also because the hardware configuration setting data have already been stored in the RAM.

Execution of the POST by the BIOS entails performing a plurality of detection tasks, for example, detecting whether the user has pressed a corresponding hotkey or detecting for a new hardware device; as a result, the time lag between booting the computer system and loading the operating system is long. Hence, plenty of system manufactures endeavors to shorten the time taken to boot a computer system in order to allow users to shorten the time taken to load an operating system. At present, the commonest methods involve reducing a program code or skipping a common or specific task. However, the program code configured for mutual dependent relationship between a platform, a device, or a chipset is likely to be removed at times. In addition, it is extremely risky to determine which program code ought to be removed, and thus optimization can only be achieved by countless trials and errors and repeated verification.

In practice, BIOS manufacturers can use a custom-made program code to shorten the time taken to boot a computer system. However, considering user's experience, it is necessary for the BIOS to maintain its interaction with a user (such as loading a setting tool program, starting a checklist, or displaying an energy star logo and a manufacturer's logo) while executing the POST. Still, it takes six to seven seconds on average to boot a computer system with a custom-made program code. Hence, in this regard, a custom-made program code is not in wide use.

Although, during a boot process, the BIOS not only allows a user to press a hotkey for performing a mechanism for interrupting the booting procedure, but also displays a menu for changing different platform settings (such as the startup priority), the user usually chooses to load the operating system directly in general situations. Accordingly, it is imperative to create a fast boot procedure whereby a user can load the operating system quickly without waiting a long time, allow the user to select different boot modes, and enable the user to boot the computer system or configure a tool setting as needed.

BRIEF SUMMARY OF THE INVENTION

The present invention relates to an expedited computer boot system and method, wherein BIOS need not perform a full POST and can load an operating system quickly by a simple initialization procedure.

The present invention relates to an expedited computer boot system and method. According to the expedited computer boot method of the present invention, upon determination that a computer system intends to enter a hibernate state or a soft-off state, the computer system is allowed to enter a sleeping state and temporarily store configuration settings of devices of the computer system in the RAM. Hence, to reboot the computer system, a fast boot mode can be selected such that, when it is detected that there is no change in the devices, the configuration settings of the devices are read from the RAM, and an operating system is reloaded quickly.

The present invention relates to an expedited computer boot system and method. The method comprises the steps of: executing a warm boot mode by a computer system, actuating a fast boot mode selectively, and, upon detection that there is no change in devices of the computer, reading configuration settings of the devices from the RAM and reloading an operating system quickly.

The present invention relates to an expedited computer boot system and method. The method provides dual-mode boot selection for use in the switching of a module for selecting a boot mode to allow a user to select a fast boot mode or a normal boot mode for loading an operating system.

In order to achieve the above and other objectives, the present invention provides a system for expediting a boot process of a computer, the system comprising: a random access memory (RAM) for storing configuration settings of devices coupled to a computer system; a read only memory (ROM) for storing a basic input/output system (BIOS) that executes power-on self test (POST); and a module for selecting a boot mode, the module including at least one detecting unit that detects whether there is a change in the devices coupled to the computer system; and a fast boot unit that reads the configuration settings stored in the RAM when the detecting unit detects that there is no change in the devices, that loads an operating system based on the configuration settings; when the detecting unit detects that there is a change in the devices, and the ROM is read.

In order to achieve the above and other objectives, the present invention further provides a method for expediting a boot process of a computer. The method comprises the steps of: turning on a power of a computer system; executing power-on self test (POST); loading an operating system; determining whether to enter a hibernate state or a soft-off state; when the hibernate state or the soft-off state is entered, determining whether a fast boot mode is actuated; when it is determined that the fast boot mode is actuated, entering a sleeping state and temporarily storing configuration settings of devices of the computer system in a random access memory (RAM); rebooting the computer system; and when it is detected that there is no change in the devices, reading the configuration settings of the devices from the RAM and reloading the operating system.

In order to achieve the above and other objectives, the present invention further provides a method for expediting a boot process of a computer. The method comprises the steps of: turning on a power of a computer system; executing power-on self test (POST); loading an operating system; determining whether to execute a warm boot; when the warm boot mode is executed, determining whether the fast boot mode is actuated; and when it is detected that there is no change in devices of the computer system, reading configuration settings of devices from a random access memory (RAM) and reloading the operating system.

In order to achieve the above and other objectives, the present invention further provides a method for expediting a boot process of a computer. The method comprises the steps of: turning on a power of a computer system; actuating a fast boot mode and detecting whether there is a change in devices of the computer system; when the fast boot mode is actuated and when there is no change in the devices, reading configuration settings of the devices from a random access memory (RAM) and not executing a power-on self test (POST); loading an operating system; determining whether to permit the power to be converted into hibernate state or soft-off state; if yes, determining whether the fast boot mode is actuated; when it is determined that the fast boot mode is not actuated, turning off the power; and when it is determined that the fast boot mode is actuated, entering a sleeping state.

The aforesaid method comprises a canceling step whereby a user may interrupt the entry into the fast boot mode.

The implementation of the present invention at least involves the following inventive steps:

1. after booting a computer system, a user can load an operating system without being kept waiting a long time, thereby shortening the waiting time for loading an operating system greatly;
2. after booting a computer system, a user can restore the operating system quickly even when the user has selectively made the computer system enter a hibernate state or a soft-off state, thereby saving power and enhancing the efficiency of the computer system;
3. when executing a warm boot, a user can reload the operating system quickly with the fast boot mode being actuated, even if the user reboots computer system, thereby shortening the waiting time; and
4. after booting a computer system, a user can not only load the operating system quickly but also select a normal boot mode by means of a keyboard shortcut, such that the system booting procedure features enhanced flexibility.

The detailed features and advantages of the present invention are described in detail in the preferred embodiments of the present invention so as to enable persons skilled in the art to gain insight into the technical disclosure in the present invention and implement the present invention accordingly and readily understand the objectives and advantages of the present invention by making reference to the disclosure contained in the specification, the claims, and the drawings of the present invention.

DETAILED DESCRIPTION OF THE EMBODIMENTS OF THE INVENTION

Figure 2:
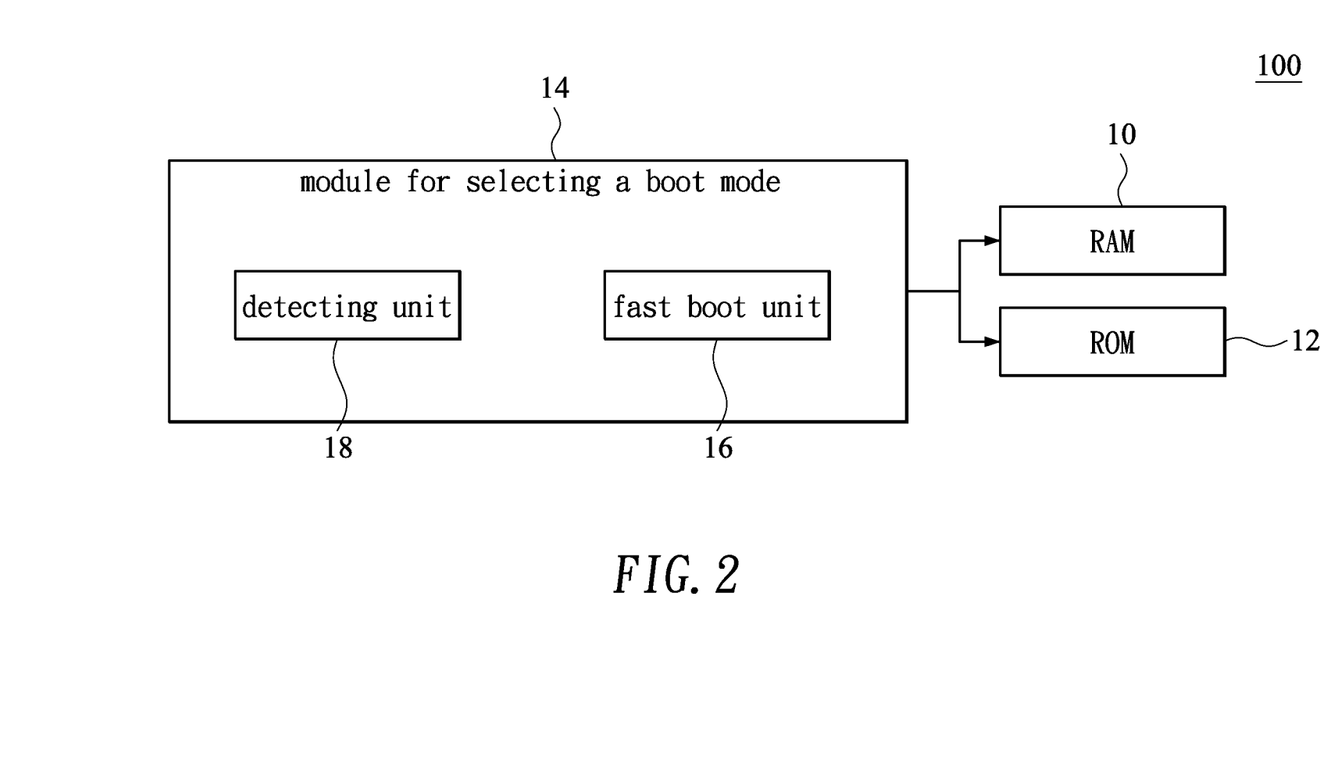
FIG. 2 is a schematic view of the basic structure of an expedited computer boot system according to an embodiment of the present invention.

Referring to FIG. 2, there is shown a schematic view of the basic structure of an expedited computer boot system 100 according to an embodiment of the present invention. As shown in FIG. 2, the expedited computer boot system 100 comprises a random access memory (RAM) 10, a read only memory (ROM) 12, and a module 14 for selecting a boot mode. The module 14 for selecting a boot mode enables a user to select a boot mode and at least comprises a fast boot unit 16 and a detecting unit 18. The detecting unit 18 detects whether there is a change in devices coupled to the computer system, for example, detecting whether a user has added or removed a hardware device.

The RAM 10 stores configuration settings of devices coupled to the computer system. The ROM 12 stores a basic input/output system (BIOS) for executing a power-on self test (POST). The fast boot unit 16 can be a BIOS instruction set. The user can directly actuate the fast boot unit 16 by means of the BIOS configuration menu, or actuate the fast boot unit 16 by means of an application program of the operating system.

In this embodiment, during a process of booting the computer system, if the detecting unit 18 detects that there is no change in the devices coupled to the computer system and that the fast boot unit 16 is actuated, the fast boot unit 16 reads the configuration settings stored in the RAM 10 and loads the operating system according to the configuration settings to skip the POST procedure, thereby shortening the time taken to boot a computer system. However, if the detecting unit 18 detects that there is a change in the devices, the ROM 12 will be read, and the full POST will be executed.

Figure 3:
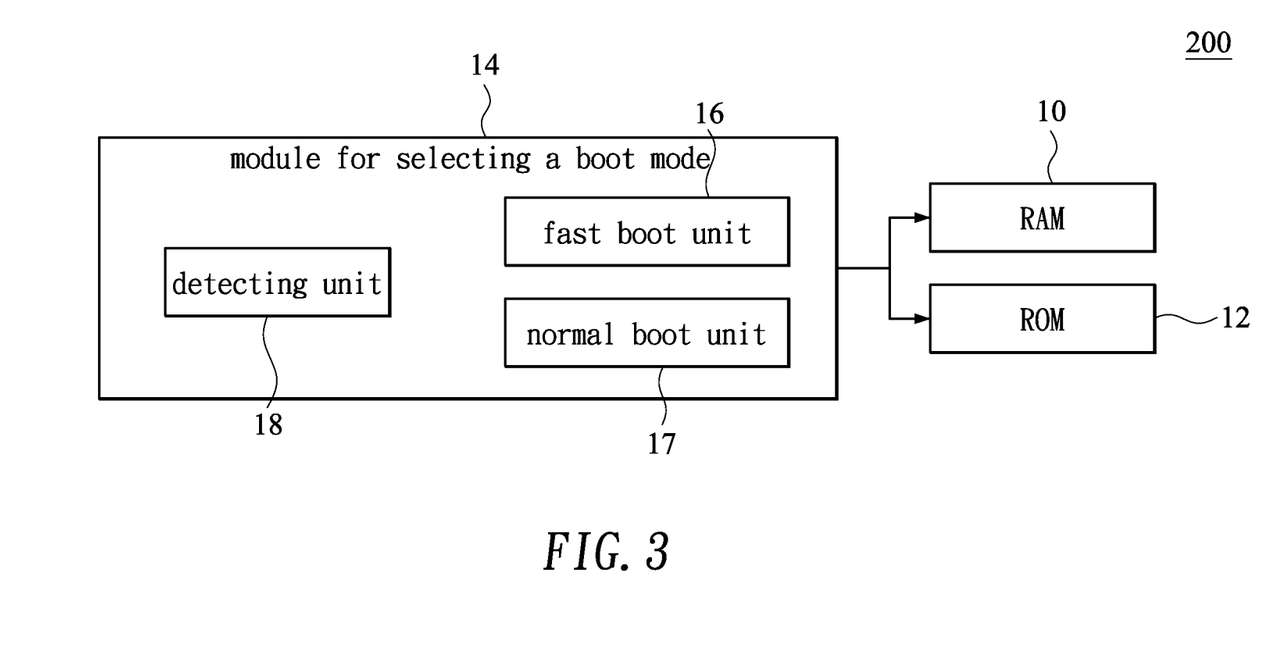
FIG. 3 is a schematic view of the basic structure of an expedited computer boot system according to another embodiment of the present invention.

Referring to FIG. 3, there is shown a schematic view of the basic structure of an expedited computer boot system 200 according to another embodiment of the present invention. As shown in FIG. 3, in this embodiment, the expedited computer boot system 200 comprises a RAM 10, a ROM 12, and a module 14 for selecting a boot mode. The module 14 for selecting a boot mode at least comprises a fast boot unit 16, a normal boot unit 17, and a detecting unit 18. This embodiment differs from the preceding embodiment in that, in this embodiment, the expedited computer boot system 200 features a dual-mode boot and further comprises the normal boot unit 17. Hence, the description of the expedited computer boot system 200 in this embodiment is hereunder focused on the normal boot unit 17.

After the computer system has been booted, the full POST is usually performed, and then the existing operating system is loaded. However, with the expedited computer boot system 200 in this embodiment, the computer system is booted by means of a fast boot mode when it is detected that the fast boot unit 16 is actuated and when there is no change in the devices, thereby shortening the time taken to boot computer system. Conversely, if it is determined that the fast boot unit 16 is not actuated, or if there is a change in the devices, the normal boot unit 17 will be actuated, and the BIOS stored in the ROM 12 will be read during a boot process, so as to execute the full POST. In other words, the computer system enters a conventional boot mode instead of the fast boot mode.

Also, the user can trigger a keyboard shortcut (such as F2 key or Esc key) in hardware (such as a keyboard) to cause the computer system to generate a key triggering signal for interrupting the fast boot mode, enable the fast boot unit 16 to enter a non-actuated state, and actuate the normal boot unit 17, thereby allowing the BIOS to execute the full POST.

Figure 4:
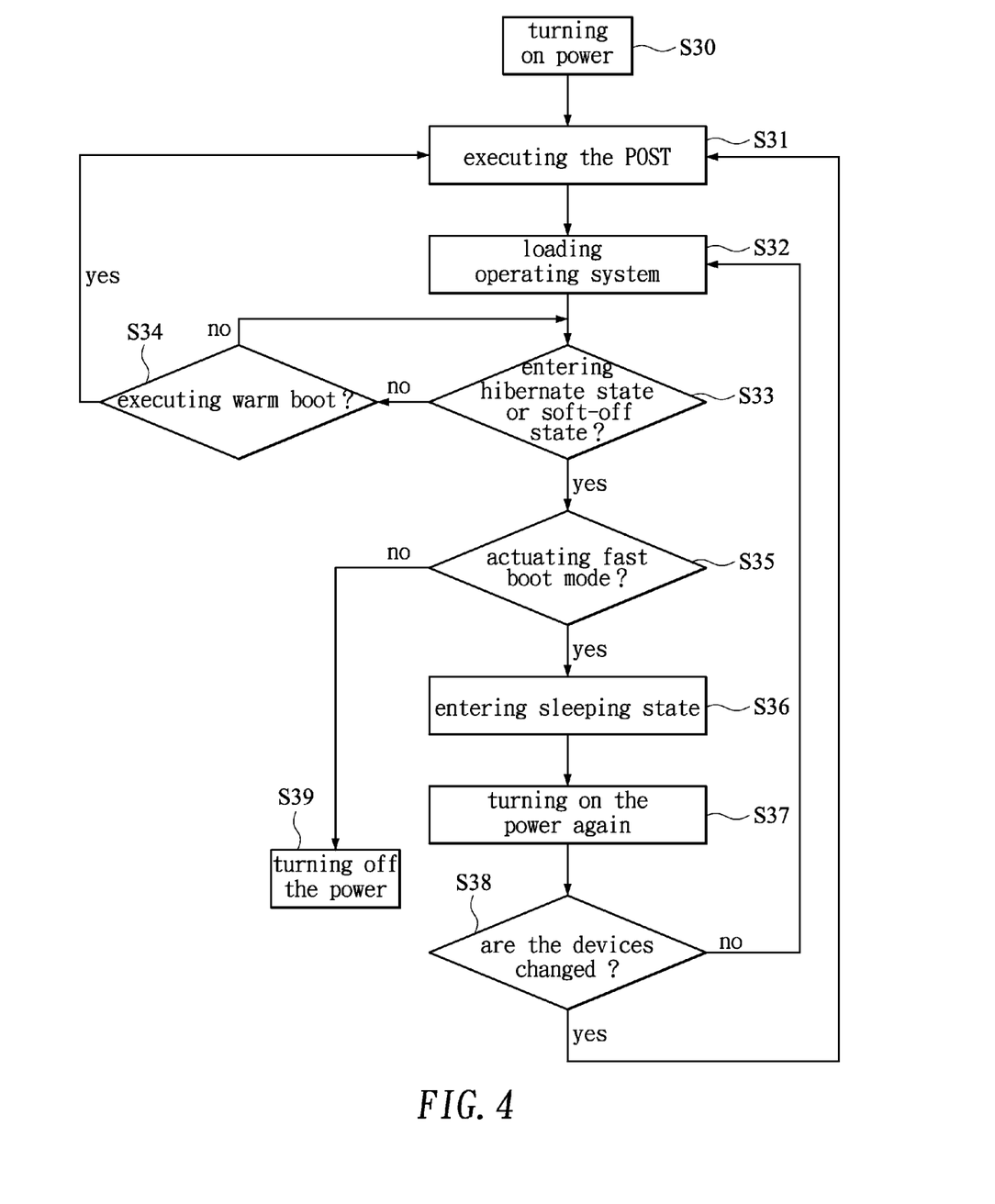
FIG. 4 is a flow chart of an expedited computer boot method according to a first embodiment of the present invention.

Referring to FIG. 2 and FIG. 4, there is shown in FIG. 4 a flow chart of an expedited computer boot method according to a first embodiment of the present invention. In the first embodiment, the method comprises the steps of: turning on a power (step S30); executing the POST (step S31); loading an operating system (step S32); determining whether to enter a hibernate state or a soft-off state (step S33); determining whether to execute a warm boot (step S34); determining whether to actuate a fast boot mode (step S35); entering a sleeping state (step S36); turning on the power again (step S37); re-detecting whether there is a change in devices (step S38); and turning off the power (step S39).

Turning on a power (step S30): turning on the power of a computer system, that is, booting the computer system.

Executing the POST (step S31): executing the full POST by the BIOS with a warm boot or in a hibernate state or even a cold boot mode.

Loading an operating system (step S32): loading an operating system, such as Linux or Microsoft 7, installed on the computer system.

Determining whether to enter the hibernate state or the soft-off state (step S33): determining, in an attempt to exit the operating system, whether the user selects to enter the hibernate state or the soft-off state.

Executing a warm boot (step S34): determining whether the user selects to execute the warm boot, if the user selects not to enter the hibernate state or the soft-off state; if the user selects to execute the warm boot, the computer system will go to step S31 of executing the full POST by the BIOS; if the user selects not to execute the warm boot, the computer system will go to step S33.

Determining whether to actuate a fast boot mode (step S35): if the user selects to enter the hibernate state or the soft-off state, then it is necessary to determine again whether the fast boot mode is actuated, wherein the fast boot mode is actuated by setting the fast boot unit 16. The user can perform a setting operation by a setting menu of the BIOS or by an application in the operating system, so as to actuate the fast boot mode by the BIOS or the application.

Entering a sleeping state (step S36): if the fast boot mode is actuated, the BIOS will not allow the computer system to enter the hibernate state or the soft-off state but will allow the computer system to enter the sleeping state. Meanwhile, the contents of the RAM 10 are preserved, and the RAM 10 enters a self-refresh mode, that is, refreshing the latest values pertaining to the states of the devices of the computer system and then storing the refreshed values in the RAM 10 temporarily.

Turning on the power again (step S37): the user can reboot the computer system or restarts the computer system.

Re-detecting whether there is a change in devices (step S38): the detecting unit 18 detects whether there is a change in the hardware or peripheral devices of the computer system. Upon actuation of the fast boot mode and entry into the sleeping state, the configuration settings of the devices are stored in the RAM 10. If it is detected that there is no change in the devices, the fast boot unit 16 will read the configuration settings stored in the RAM 10, so as to restore the original configuration settings and reload the operating system. Conversely, if the detecting unit 18 detects that there is a change in the devices coupled to the computer system, then the ROM 12 will be read, and the full POST will be executed.

Turning off the power (step S39): if, in step S35, the user does not select to actuate the fast boot mode, the computer system will turn off the power automatically and, after the computer system is restarted, the BIOS will execute the full POST in order to load the operating system.

Figure 5:
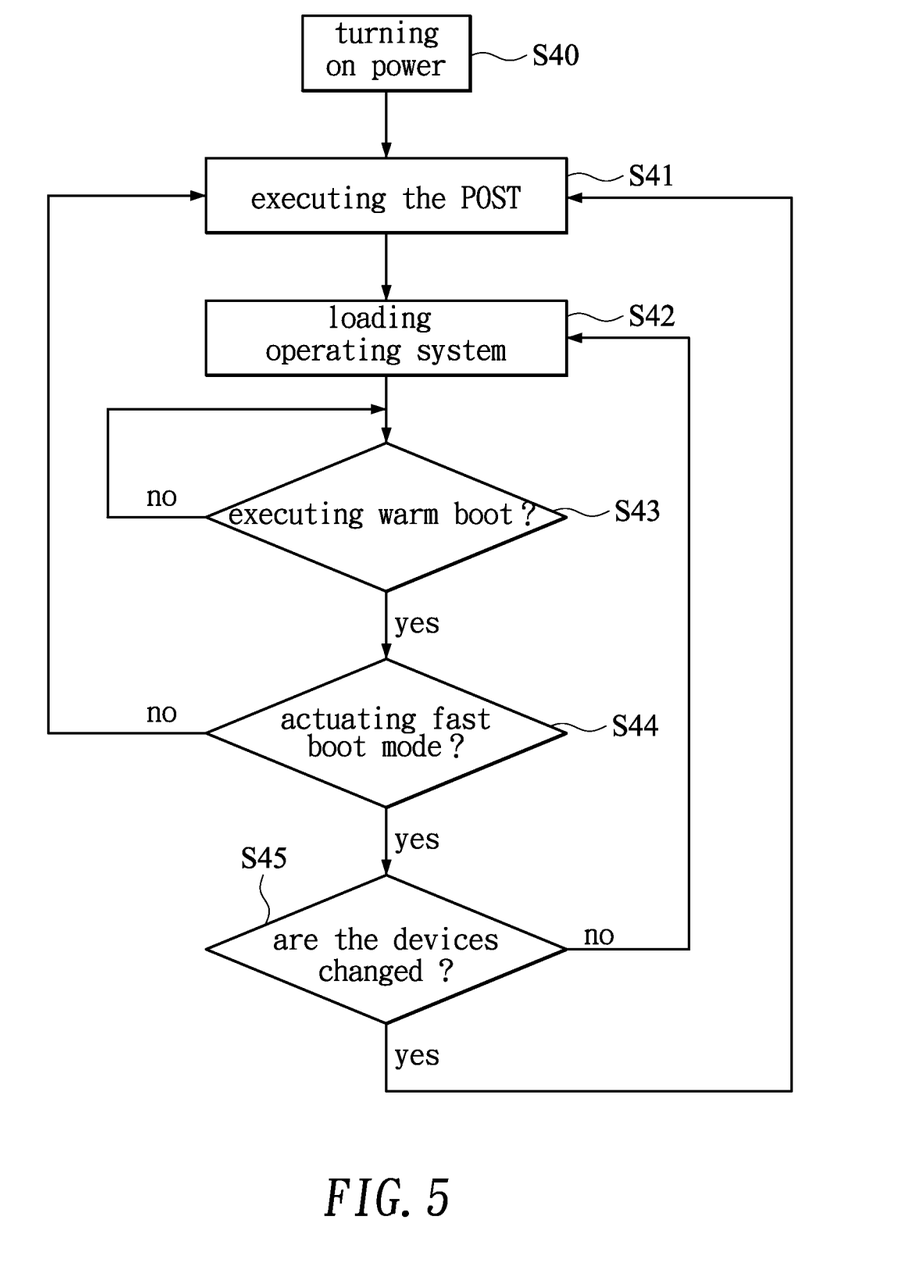
FIG. 5 is a flow chart of an expedited computer boot method according to a second embodiment of the present invention.

Referring to FIG. 2 and FIG. 5, there is shown in FIG. 5 a flow chart of an expedited computer boot method according to a second embodiment of the present invention. In the second embodiment, the method comprises the steps of: turning on a power (step S40); executing the POST (step S41); loading an operating system (step S42); determining whether to execute a warm boot (step S43); determining whether to actuate a fast boot mode (step S44); and re-detecting whether there is a change in the devices (step S45).

Turning on a power (step S40): booting a computer system.

Executing the POST (step S41): the BIOS executes the full POST.

Loading an operating system (step S42): loading an operating system, such as Linux or Microsoft 7, installed on the computer system.

Determining whether to execute a warm boot (step S43): determining whether the user selects the warm boot, if the user wants to exit the operating system, wherein the warm boot comprises not turning off the power of the computer system in case of a need to restart the computer system.

Determining whether to actuate a fast boot mode (step S44): going to step S45, if the user selects the warm boot so as to reboot the computer system and when it is detected that a fast boot mode is actuated. If the user does not select to enter the fast boot mode, which means that the fast boot unit 16 is not actuated, then go to step S41 so as to re-execute the full POST by the BIOS.

Also, the user can perform setting from the setting menu of the BIOS, so as to actuate the fast boot mode. Alternatively, when the user selects to execute the warm boot, the operating system will automatically execute an application for allowing the user to select whether to shut down the fast boot unit 16 in order to set a boot mode for the computer system.

Re-detecting whether there is a change in devices (step S45): if the user selects to actuate the fast boot mode, then it is necessary for the detecting unit 18 to re-detect whether there is a change in the devices. If the detecting unit 18 does not detect any change in the devices and when it is detected that the fast boot mode is actuated, then the configuration settings stored in the RAM 10 will be restored so as to load the operating system again, thereby shortening the time taken to boot computer system. Conversely, if the detecting unit 18 detects a change in the devices, then the ROM 12 will be read, so as to execute the full POST.

Figure 6:
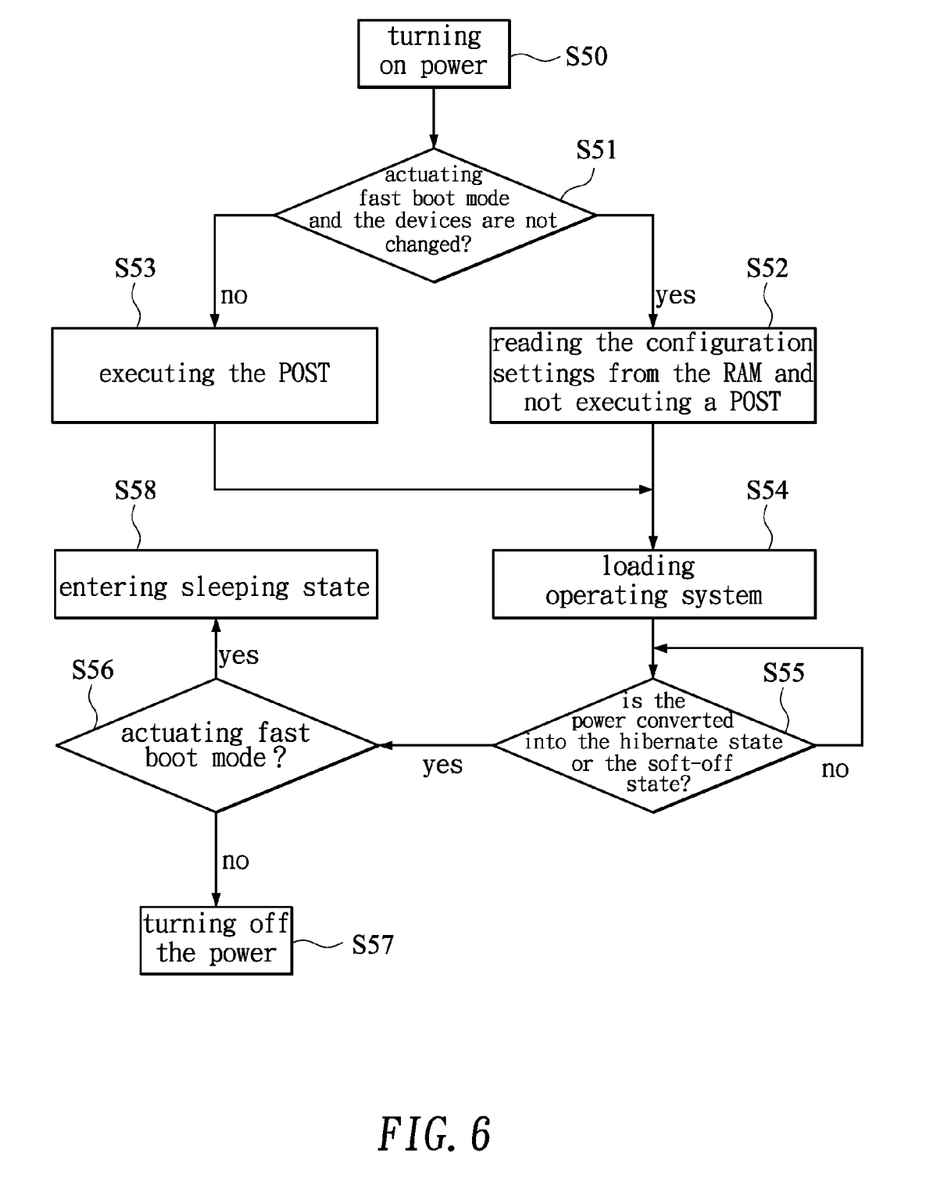
FIG. 6 is a flow chart of an expedited computer boot method according to a third embodiment of the present invention.

Referring to FIG. 3 and FIG. 6, there is shown in FIG. 6 a flow chart of an expedited computer boot method according to a third embodiment of the present invention. In the third embodiment, normally, a booting step does not comprise displaying a menu, a logo, or a message but comprises booting primarily a hard disk storing an operating system such that the user only triggers a keyboard shortcut (for example, by pressing F2 key or ESC key) to interrupt a fast boot mode in case of a special need, and loads the operating system after performing a full POST.

The method for expediting a boot process of a computer comprises the steps of: turning on a power (step S50); determining whether to actuate a fast boot mode and when it is detected that there is no change in devices (step S51); reading the configuration settings of the devices from the RAM and not executing a POST (step S52); executing the POST (step S53); loading an operating system (step S54); determining whether to permit the power to be converted into the hibernate state or the soft-off state (step S55); determining whether to actuate the fast boot mode (step S56); turning off the power (step S57); and entering a sleeping state (step S58).

Turning on a power (step S50): booting a computer system.

Determining whether to actuate a fast boot mode and when it is detected that there is no change in devices (step S51): determining whether the fast boot unit 16 is actuated, if yes, then the detecting unit 18 detects whether there is a change in the devices.

Reading configuration settings from the RAM and not executing a power-on self test (POST) (step S52): if the fast boot mode is actuated and when it is detected that there is no change in the devices, then the fast boot unit 16 restores the configuration settings stored in the RAM 10 and loads the operating system without executing a full POST.

Entering a POST by the BIOS (step S53): if the fast boot mode is not actuated or if it is detected that there is a change in the devices, then the normal boot unit 17 will read the BIOS stored in the ROM 12 so as to execute the full POST.

Loading the operating system (step S54): loading the operating system, such as Linux or Microsoft 7, according to step S52 or step S53.

Determining whether to permit the power to be converted into the hibernate state or the soft-off state (step S55): determining, when the user attempts to exit the operating system, whether the user selects the hibernate state or the soft-off state; if yes, going to step S56; if no, continuing with step S55.

Determining whether to actuate the fast boot mode (step S56): determining again whether the fast boot mode is actuated, if the user selects to enter the hibernate state or the soft-off state; if the fast boot mode is not actuated, going to step S57.

Turning off the power (step S57): turning off the power of the computer system, if the user does not actuate the fast boot mode.

Entering a sleeping state (step S58): if the fast boot mode is actuated, the BIOS will not allow the computer system to enter the hibernate state or the soft-off state but will allow the computer system to enter a sleeping state; meanwhile, the contents of the RAM 10 are preserved, and the RAM 10 enters a self-refresh mode. Hence, if the user wants to restart the computer system and the detecting unit 18 does not detect any change in hardware or peripheral devices of the computer system, the configuration settings stored in the RAM 10 will be read, so as to restore the original configuration settings and reload the operating system.

Figure 7:
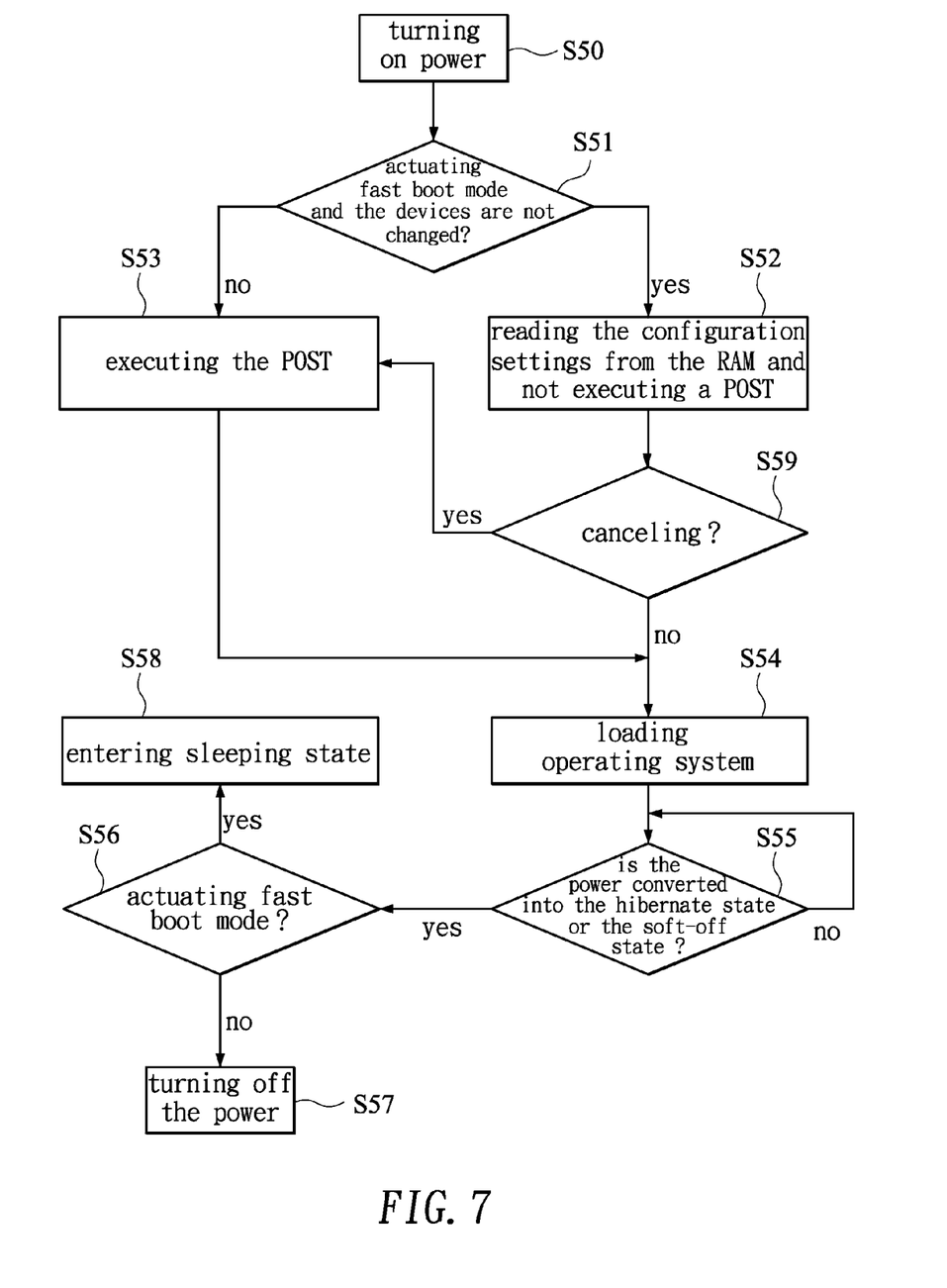
FIG. 7 is a flow chart of an expedited computer boot method according to a fourth embodiment of the present invention.

Referring to FIG. 3, FIG. 6 and FIG. 7, there is shown in FIG. 7 a flow chart of an expedited computer boot method according to a fourth embodiment of the present invention. The fourth embodiment differs from the third embodiment only in that, in the fourth embodiment, the expedited computer boot method further comprises a canceling step (step S59) between step S52 and step S54. For example, after executing step S52, the operating system automatically executes an application whereby the user selects whether to read the configuration settings from the RAM 10 and load the operating system directly. If the user executes an operation (for example, inputting an instruction) and cancels the loading of the operating system, then go to step S53, so as to read the BIOS stored in the ROM 12, execute the POST by the BIOS, and load the operating system.

Also, the user can trigger a keyboard shortcut (such as F2 key or Esc key) in hardware to interrupt a fast boot mode and enable the fast boot unit 16 to enter a non-actuated state, thereby allowing the normal boot unit 17 to execute the full POST by the BIOS.

Upon implementation of the above embodiments, the user can load an operating system quickly after booting a computer system or attempting to restart the computer system, without being kept waiting a long time. Also, only in case of a special need, will the user perform a setting operation in a general menu mode by triggering a keyboard shortcut, thereby enhancing the efficiency of booting a computer system.

The features of the present invention are disclosed above by preferred embodiments to allow persons skilled in the art to gain insight into the contents of the present invention and implement the present invention accordingly. The preferred embodiments of the present invention should not be interpreted as restrictive of the scope of the present invention. Hence, all equivalent modifications or amendments made to the aforesaid embodiments should fall within the scope of the appended claims.

What is claimed is:

1. A method for expediting a boot process of a computer, the method comprising the steps of:

turning on a power of a computer system;
executing a power-on self test (POST);
loading an operating system;
determining whether to enter a hibernate state or a soft-off state;
when the hibernate state or the soft-off state is entered, determining whether a fast boot mode is actuated;
when the fast boot mode is not actuated, entering the hibernate state or the soft-off state so the power of the computer is turned off;
when it is determined that the fast boot mode is actuated, entering a sleeping state, but not entering the hibernate state or the soft-off state, to store configuration settings of devices of the computer system in a random access memory (RAM) so the power of the computer is turned off;
turning on the power of the computer system again, and detecting whether there is no change in the devices; and
when it is detected that there is no change in the devices, reading the configuration settings of the devices from the RAM and reloading the operating system to skip executing the POST.

2. The method of claim 1, wherein the fast boot mode is actuated by a basic input/output system (BIOS) or an application program of the operating system.

3. A method for expediting a boot process of a computer, the method comprising the steps of:
turning on a power of a computer system;
determining whether a fast boot mode is actuated and detecting whether there is a change in devices of the computer system;
when the fast boot mode is actuated and when there is no change in the devices, reading configuration settings of the devices from a random access memory (RAM) to skip executing a power-on self test (POST);
loading an operating system;
determining whether the power is converted into a hibernate state or a soft-off state;
if yes, determining whether the fast boot mode is actuated again;
when it is determined that the fast boot mode is not actuated, turning off the power by entering the hibernate state or the soft-off state; and
when it is determined that the fast boot mode is actuated, entering a sleeping state but not entering the hibernate state or the soft-off state.

4. The method of claim 3, wherein the fast boot mode is actuated by a basic input/output system (BIOS) or an application program of the operating system.

5. The method of claim 3, wherein when it is detected that there is a change in the devices of the computer system, executing the POST and reloading the operating system.

6. The method of claim 3, further comprising a canceling step between the step of reading configuration settings of the devices from a RAM and not executing a POST and the step of loading an operating system, the canceling step serves to cancel the loading of the operating system, and to permit a basic input/output system (BIOS) to execute the POST first and then load the operating system.

* * * * *